US009372381B2

(12) United States Patent
Vermeulen et al.

(10) Patent No.: US 9,372,381 B2
(45) Date of Patent: Jun. 21, 2016

(54) ROBUST MODULATOR CIRCUITS USING LATERAL DOPING JUNCTIONS

(71) Applicant: ACACIA COMMUNICATIONS INC., Maynard, MA (US)

(72) Inventors: Diedrik Vermeulen, Maynard, MA (US); Long Chen, Maynard, MA (US); Christopher Doerr, Maynard, MA (US)

(73) Assignee: Acacia Communications, Inc., Maynard, MA (US)

( * ) Notice: Subject to any disclaimer, the term of this patent is extended or adjusted under 35 U.S.C. 154(b) by 0 days.

(21) Appl. No.: 14/057,883

(22) Filed: Oct. 18, 2013

(65) Prior Publication Data

US 2014/0112611 A1    Apr. 24, 2014

Related U.S. Application Data

(60) Provisional application No. 61/715,514, filed on Oct. 18, 2012.

(51) Int. Cl.
*G02F 1/225*    (2006.01)

(52) U.S. Cl.
CPC .............. *G02F 1/2257* (2013.01); *G02F 1/225* (2013.01); *G02F 2201/126* (2013.01)

(58) Field of Classification Search
CPC .. G02F 1/2257; G02F 2201/126; G02F 1/225
USPC .................................... 385/2, 3, 4
See application file for complete search history.

(56) References Cited

U.S. PATENT DOCUMENTS 5,745,630 A * 4/1998 Vawter et al. ................. 385/129
2014/0341497 A1 * 11/2014 Liu et al. .......................... 385/3

OTHER PUBLICATIONS

Bogaerts et al., Silicon nanophotonic waveguides and their applications. Proc SPIE. Nov. 2008;7134:71341O.1-13. doi: 10.1117/12.803440.
Chen et al., Chirp and Dispersion Tolerance of a Single-Drive Push-Pull Silicon Modulator at 28 Gb/s. IEEE Photon Tech Lett. Mar. 15, 2012;24(11):936-8. doi: 10.1109/LPT.2012.2191149.
Kikuchi et al., 80-Gbit/s InP DQPSK modulator with an n-p-i-n structure. 2007 33$^{rd}$ European Conference and Exhibition of Optical Communication (ECOC), Berlin, Germany. Sep. 16-20, 2007;2(1):8-9. doi: 10.1049/ic:20070367. 2 pages.
Park et al., High-modulation efficiency silicon Mach-Zehnder optical modulator based on carrier depletion in a PN Diode. Opt Express. Aug. 31, 2009;17(18):15520-4.
Thompson et al., High contrast 40 Gbit/s optical modulation in silicon. Opt Express. Jun. 6, 2011;19(12):11507-16. doi: 10.1364/OE.19.011507.

* cited by examiner

*Primary Examiner* — Akm Enayet Ullah
(74) *Attorney, Agent, or Firm* — Wolf, Greenfield & Sacks, P.C.

(57) ABSTRACT

Disclosed herein are methods, structures, and devices that compensates for modulator loss and modulation inefficiencies introduced by mask misalignments in opposite oriented pn type junction modulators. More specifically, Mach-Zehnder type optical modulators are disclosed wherein both arms in the MZI modulator are arranged in a push-pull configuration and configured to experience pn type junctions of two orientations wherein both arms further configured to experience the same length of waveguide with a pn type junction of each orientation.

21 Claims, 9 Drawing Sheets

US 9,372,381 B2

ROBUST MODULATOR CIRCUITS USING LATERAL DOPING JUNCTIONS

CROSS REFERENCE TO RELATED APPLICATIONS

This application claims the benefit of U.S. Provisional Patent Application Ser. No. 61/715,514 filed Oct. 18, 2012 which is incorporated by reference in its entirety as if set forth at length herein.

TECHNICAL FIELD

This disclosure relates generally to the field of optical communications and in particular to optical modulators exhibiting a modulator circuit that compensates for differences in modulator loss and modulation efficiency introduced by mask misalignments.

BACKGROUND

Optical modulators are known to be essential building blocks of numerous contemporary photonic integrated circuits. Accordingly, methods and structures that improve such modulators are a welcome addition to the art.

SUMMARY

An advance in the art is made according to an aspect of the present disclosure directed to methods, structures that compensates for modulator loss and modulation inefficiencies introduced by mask misalignments in opposite oriented pn type junction modulators. More particularly, Mach-Zehnder type optical modulators wherein both arms in the MZI modulator are arranged in a push-pull configuration and configured to experience pn type junctions of two orientations wherein both arms are further configured to experience the same length of waveguide with a pn type junction of each orientation.

Viewed from a first aspect the present disclosure is directed to a Mach-Zehnder type optical modulator comprising: an input optical waveguide, an output optical waveguide, a first optical waveguide arm and a second optical waveguide arm each optically connecting the input optical waveguide to the output optical waveguide, wherein the first optical waveguide arm and the second optical waveguide arm cross one another such that modulator losses and inefficiencies resulting from mask misalignment are mitigated.

BRIEF DESCRIPTION OF THE DRAWING

A more complete understanding of the present disclosure may be realized by reference to the accompanying drawings in which.

DETAILED DESCRIPTION

Figure 1:
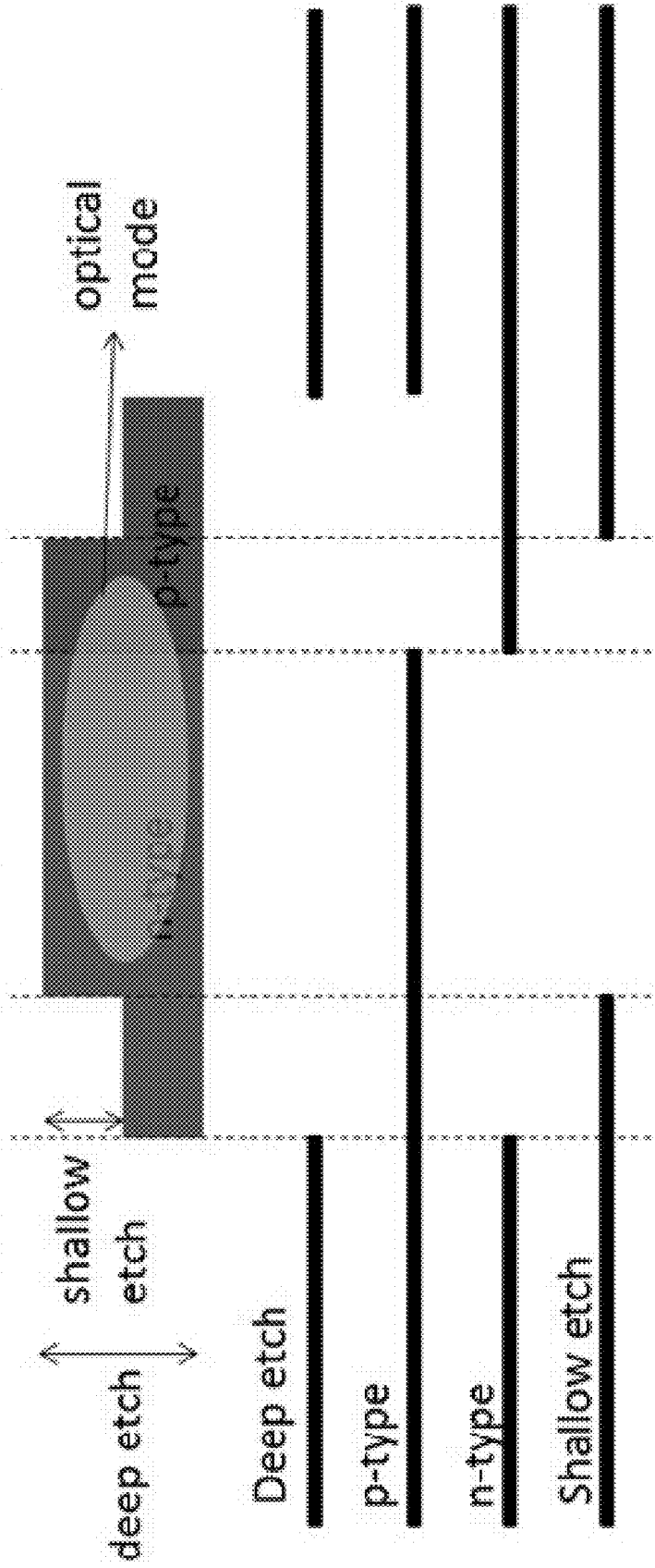
FIG. 1 shows a schematic illustration of a representative mask cross section for a waveguide with lateral p-n junction.

The following merely illustrates the principles of the disclosure. It will thus be appreciated that those skilled in the art will be able to devise various arrangements which, although not explicitly described or shown herein, embody the principles of the disclosure and are included within its spirit and scope. More particularly, while numerous specific details are set forth, it is understood that embodiments of the disclosure may be practiced without these specific details and in other instances, well-known circuits, structures and techniques have not be shown in order not to obscure the understanding of this disclosure.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

Thus, for example, it will be appreciated by those skilled in the art that the diagrams herein represent conceptual views of illustrative structures embodying the principles of the disclosure.

By way of some additional background, and with initial reference to FIG. 1, it is noted that one commonly used optical modulator type employs lateral pn diodes to achieve phase modulation. As is known, to effect the phase modulation such pn diodes may be used in either forward- or reverse-biased. And while we describe various embodiments using carrier depletion modulations on Silicon-on-Insulator (SOI) technologies, our discussions presented herein are not to be so specific or limiting as to the particular material types or platforms.

With continued reference to FIG. 1, the modulator cross section shown may be processed using four lithography steps and corresponding mask(s). Generally, two process steps namely, a shallow etch step and a deep etch step define the waveguide geometry. Two doping steps namely, the p doping step and the n doping step define the pn junction. It is noted and will be appreciated by those skilled in the art that the scheme presented is not limited to any number of masks or steps therefore our discussion is applicable to a modulator processed using an arbitrary number of masks. Accordingly, additional etch steps, doping steps or any other process step(s) may be included as dictated by any specific requirements.

The modulator loss α, modulation efficiency VπLπ and to a lesser extent the bandwidth, will be dependent upon the position of the pn junction with respect to the optical mode. As may be appreciated, any mask misalignment of the etch steps or doping steps will result in a ship of the pn junction position with respect to the optical mode—resulting in a change in absorption or modulation efficiency.

For opposite orientations of the pn junction, the position of the pn junction with respect to the optical mode will shift in the opposite direction. This is illustratively shown in FIG. 2, which illustrates a mask misalignment for waveguide modulators with opposite oriented pn junction.

Figure 2:
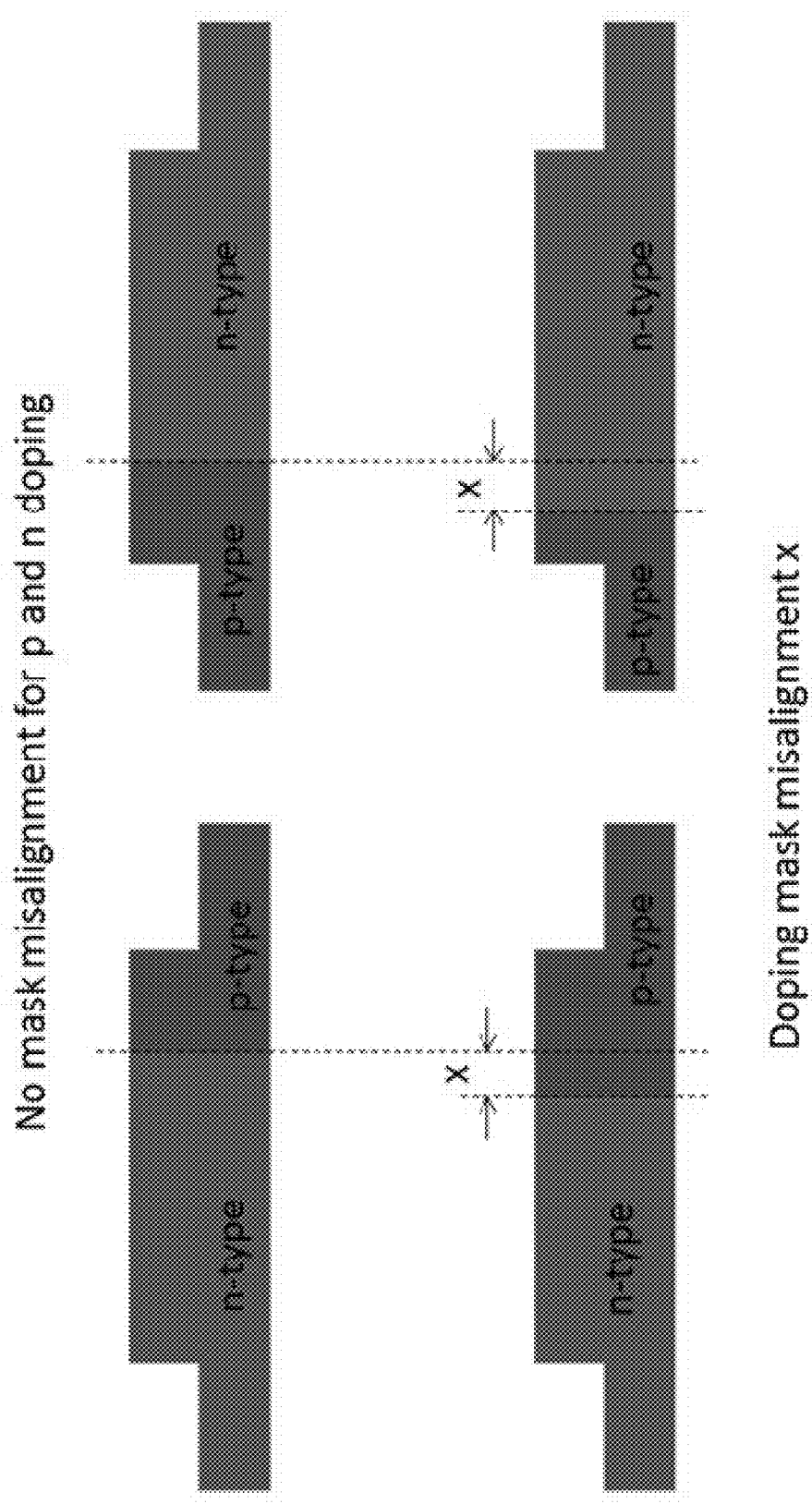
FIG. 2 shows a schematic illustration of an exemplary mask misalignment for waveguide modulators with opposite oriented pn junction.

With reference to that FIG. 2, there is illustrated a junction shift x shifted to the left (as viewing the figure) for an np junction and shifts to the right for a pn junction. This shift results in two types of modulators that—while designed to be exactly the same—but behave differently due to the non-ideal processing, i.e., mask misalignment. Those skilled in the art will appreciate that this is caused by a difference in overlap between the pn junction and the optical waveguide mode for pn junctions with different orientation.

Figure 3:
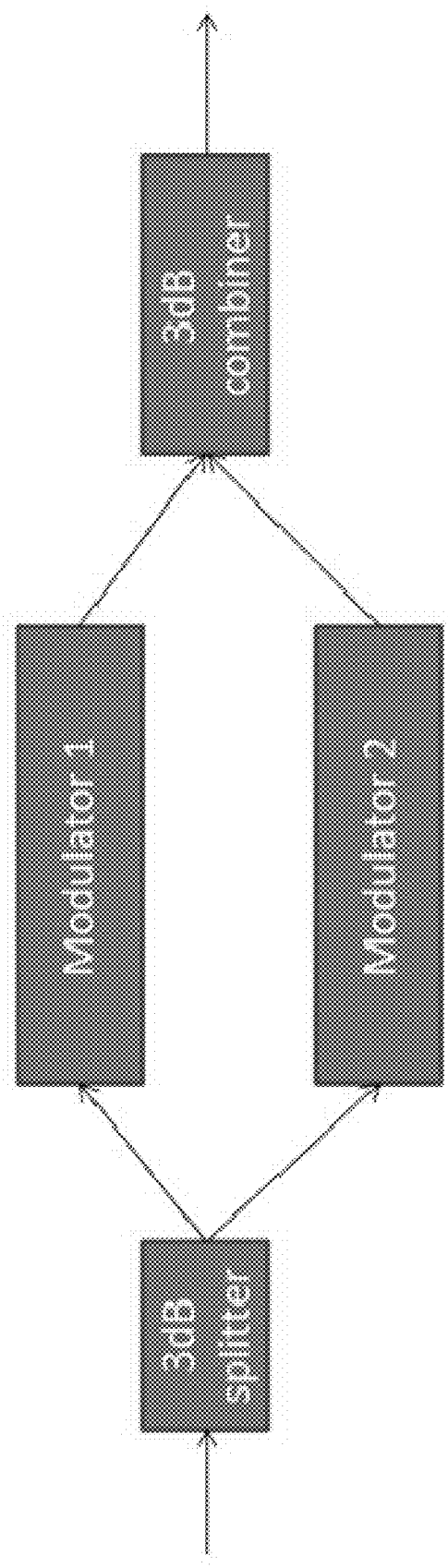
FIG. 3 shows a schematic illustration of an exemplary modulator in a Mach-Zehnder configuration.

In order to fully appreciate devices constructed according to the present disclosure, it is useful to fully understand how such mask misalignment produces problems in Mach Zehnder structures. As is known, a Mach-Zehnder Interferometer (MZI) circuit—such as that illustratively shown in FIG. 3, is used to transform a phase modulation into an amplitude modulation. In order to achieve sufficient extinction coefficient, the MZI circuit should is balanced, meaning that the optical loss in both arms, i.e., phase modulator 1 and phase modulator 2, should be equal.

By driving the MZI in a push-pull configuration, a phase chirp may be eliminated. For this, the modulators are biased at a certain bias voltage $V_0$, and driven with opposite voltages.

For high-speed operation the modulators are so-called travelling wave modulators, which are designed such that the speed of the microwave in the transmission line steering the modulator and the optical mode in the waveguide are equal. Oftentimes, an impedance matching termination resistor is placed at the end of the transmission line to avoid reflections.

When using a travelling wave MZI modulator, different kinds of configurations are possible. Choosing a suitable configuration depends on several factors such as material platform, driver chip used to drive the modulator, modulation bandwidth, impedance of the feed transmission lines of the modulator and required voltage swing.

One simple approach when phase chirp is not a major concern is to only drive one arm of the MZI modulator using pn junctions—for example. The MZI is then balanced by introducing dummy pn junctions in the non-modulated arm. By making sure that these dummy pn junctions have the same orientation as the ones in the arm that is modulated, the same optical loss is introduced independent of the mask misalignment. Alternatively—instead of using dummy pn junctions—an asymmetric power splitter may be used to compensate for the loss in the waveguide arm that is modulated. Additionally, by making the power splitter tunable, it is possible to compensate for mask misalignments.

If one is concerned with the phase chirp, the MZI modulator needs to be driven in a push-pull configuration. When so driven, the modulator is then biased at $V_0$ and driven by opposite voltages. Equalizing the loss is typically achieved by having pn junctions with the same orientation in both arms.

Figure 4:
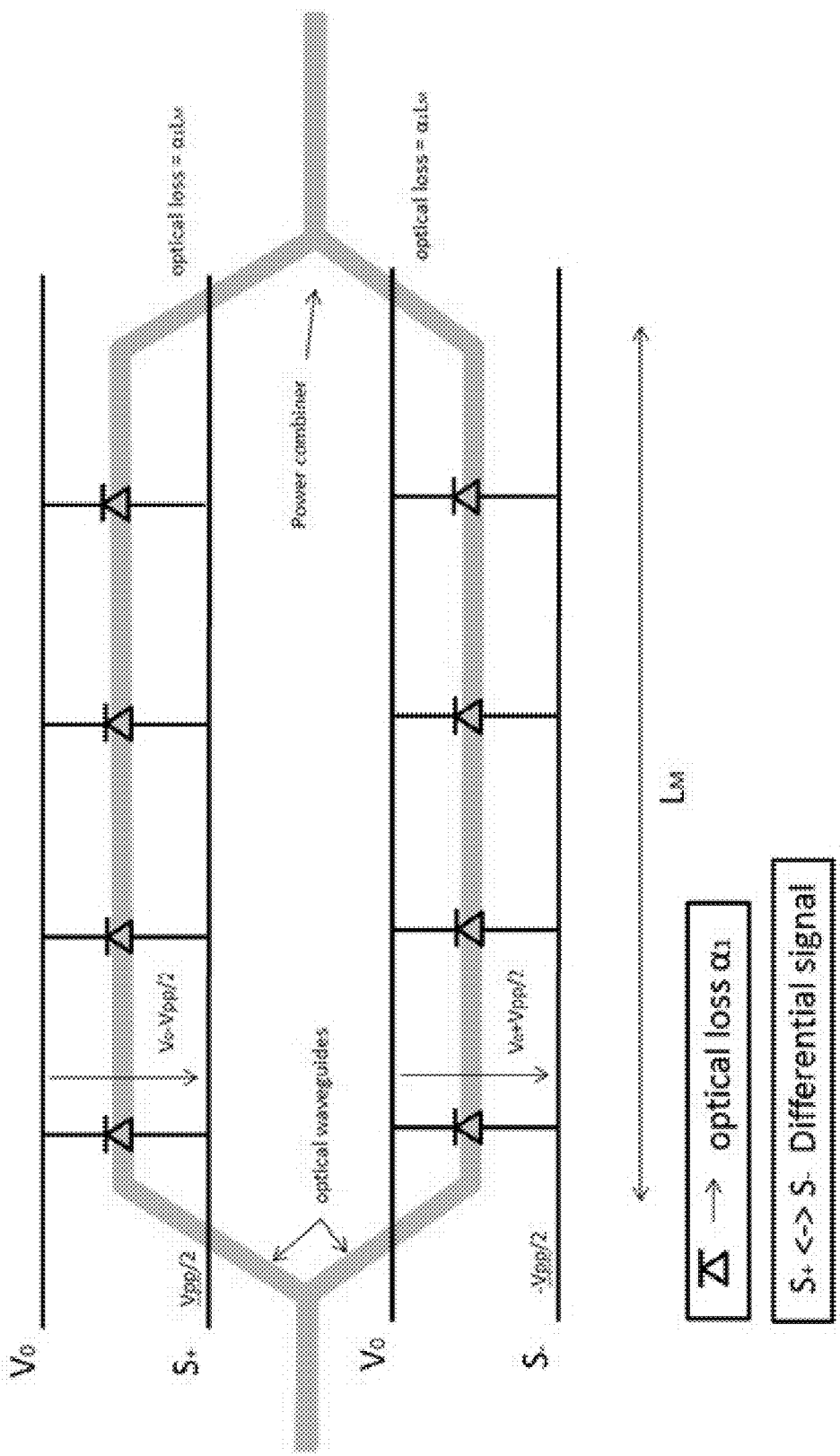
FIG. 4 shows a schematic illustration of an exemplary Push-Pull Mach-Zehnder modulator with equally oriented pn junctions in both waveguide arms and controlled by two transmission lines.

This configuration where each modulator is driven by its own transmission line is illustratively depicted in FIG. 4. With reference to that FIG. 4, there is shown a push-pull MZI modulator with equally oriented pn junctions in both waveguide arms and controlled by two transmission lines. The loss in both waveguide arms is the loss α1 introduced by the pn junctions times the modulation length Lm. One drawback of this configuration shown is that bandwidth is reduced because the diodes are configured in parallel.

For a travelling wave modulator, the bandwidth is determined by the loss introduced by the RF lines. This RF loss or microwave attenuation will decrease when the capacitance per unit length can be decreased. One example is to drive the push-pull modulator by one differential transmission line and having the pn junctions in series, as shown in FIG. 5.

Figure 5:
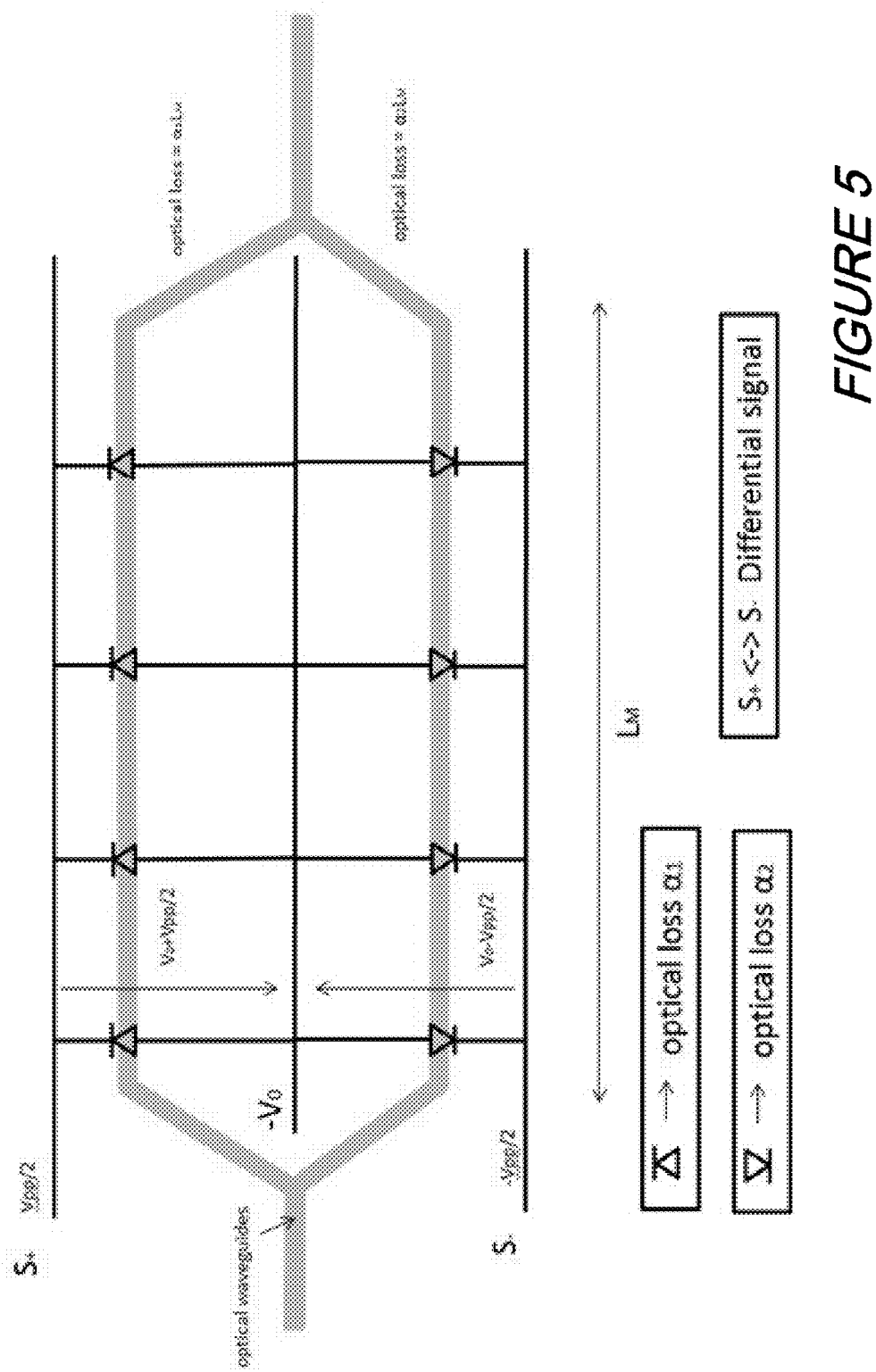
FIG. 5 shows a schematic illustration of a push-pull Mach-Zehnder modulator with opposite oriented pn junctions in series driven by a differential transmission line.

FIG. 5 illustrates a push-pull modulator with opposite oriented pn junctions in series and driven by a differential transmission line. This configuration shown will decrease the capacitance per unit length by a factor of 2. One problem with this configuration however, is that the arms need to have opposite oriented pn junctions. In the case of mask misalignment, this will introduce a difference in optical loss between the two modulator arms of the MZI and therefore limit the extinction ratio.

One possible solution to this misalignment is to use a tunable power splitter that compensates the modulator loss difference. However, not only is the loss different (in the case of mask misalignment) between modulators with opposite oriented pn junctions, but the modulation efficiency. Having different modulation efficiencies in the arms will introduce a phase chirp as the modulator is never completely in push-pull configuration.

With these principles in place, we may now describe in detail configurations of modulators and circuits that compensates for the difference in modulator loss and modulation efficiency introduced by mask misalignments in opposite oriented pn junction modulators. As we shall show, circuits according to the present disclosure may advantageously be very general and applied to a broad class of modulator configurations to compensate for mask misalignment in lateral doped waveguide junctions.

Briefly stated—and according to an aspect of the present disclosure—both arms of the MZI modulator in push-pull configuration experience the same length of waveguide with a pn junction having a particular orientation. Consequently, this equalizes the optical loss and modulation efficiency in both MZI arms thereby realizing a balanced MZI modulator in push-pull mode without exhibiting phase chirp.

Figure 6:
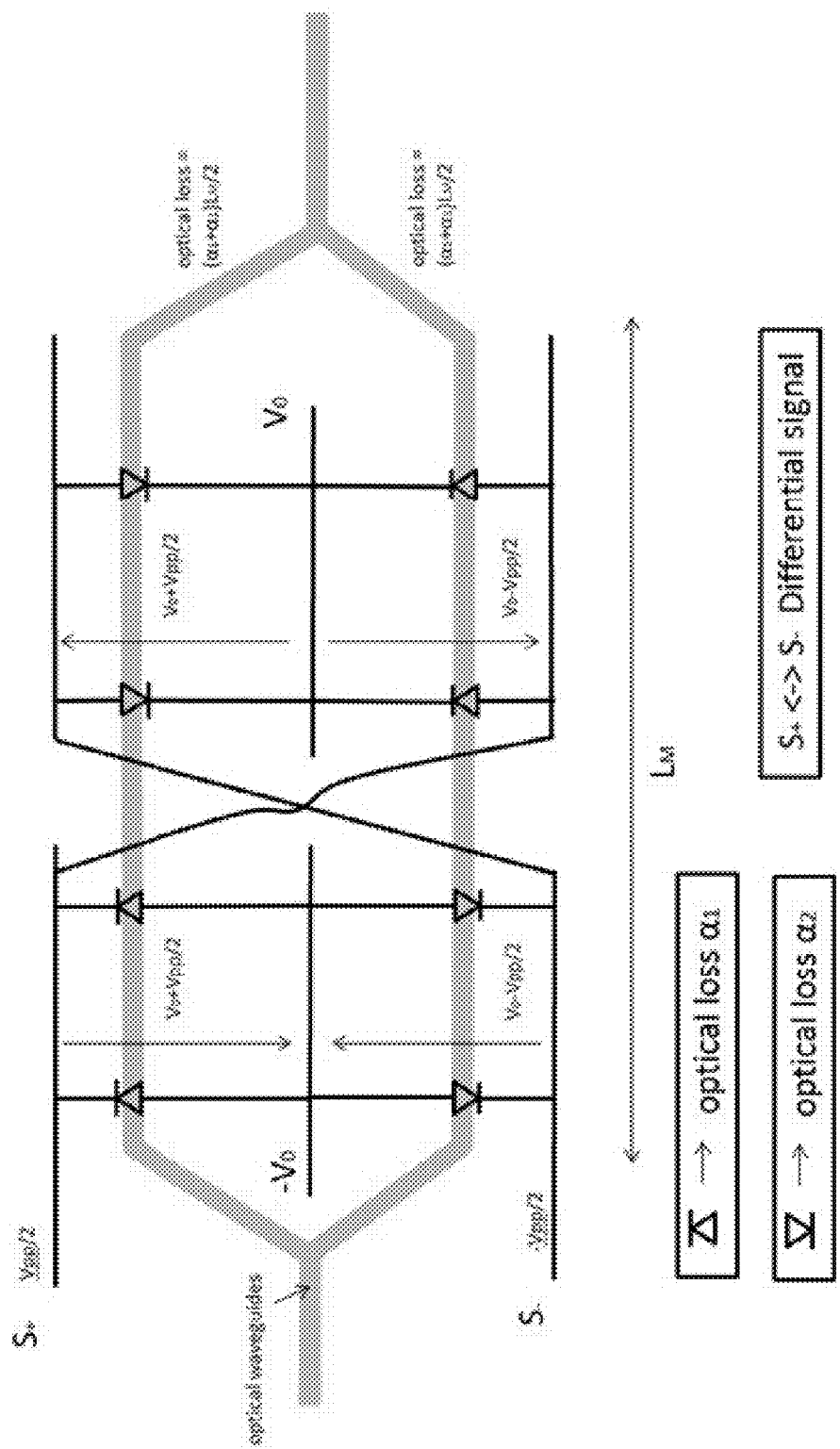
FIG. 6 shows a schematic illustration of a mask misalignment compensated Mach-Zehnder push-pull modulator with crossed signal lines, switched pn junctions and switched bias according to an aspect of the present disclosure.

With reference now to FIG. 6 there is shown a mask misaligned compensated MZI push-pull modulator with crossed signal lines, switched pn junctions and switched bias according to an aspect of the present disclosure. As may be appreciated, the pn junction orientation in the arms is effectively switched after one half of the length Lm of the modulator. In order to achieve the correct voltage swing over the modulator diodes, the signal lines of the differential transmission lines have to be switched and the bias $V_0$ is reversed for the second half of the modulator. As may be appreciated, such a configuration results in both modulator arms experiencing an equal modulation efficiency and an equal optical loss which may be expressed as $(\alpha1+\alpha2)Lm/2$.

Figure 7:
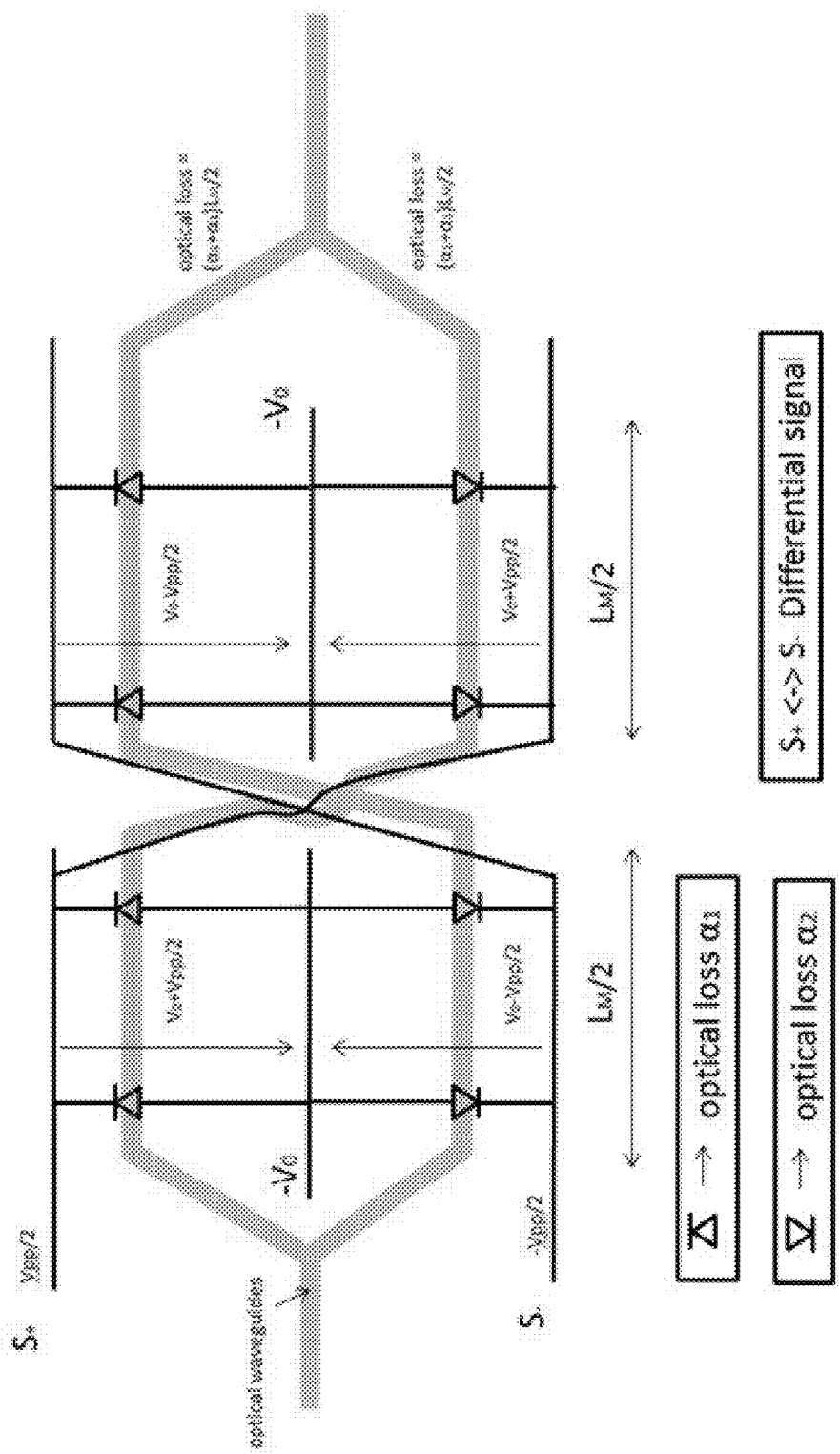
FIG. 7 shows a schematic illustration of a mask misalignment compensated Mach-Zehnder push-pull modulator with crossed signal lines and crossed optical waveguides according to an aspect of the present disclosure.

Another exemplary configuration according to the present disclosure is illustratively shown in FIG. 7, which illustratively shows a mask misalignment compensated MZI push-pull modulator with crossed signal lines and crossed optical waveguide according to yet another aspect of the present disclosure. As may be observed, the optical waveguides are switched by crossing them as illustrated in this figure. Also, the signal lines of the differential transmission lines are switched as well.

Notably, crossing the waveguides may be performed with very low loss and crosstalk. The crossing may be perfectly symmetrical so that both waveguides will experience the exact same amount of optical loss and delay.

Crossing the signal lines of the differential transmission line is more difficult but may be done using an additional metal layer and vias, air bridge or wire bond for example. This crossing is typically not symmetrical and therefore more RF loss and/or Rf delay is introduced into one of the signal lines thereby resulting in an asymmetry.

One possible solution to this asymmetry is to introduce a dummy transition in one of the signal lines such that the difference in RF loss and delay is compensated. One can also divide the modulator into an uneven amount of sections and therefore even amount of crossings.

Figure 8:
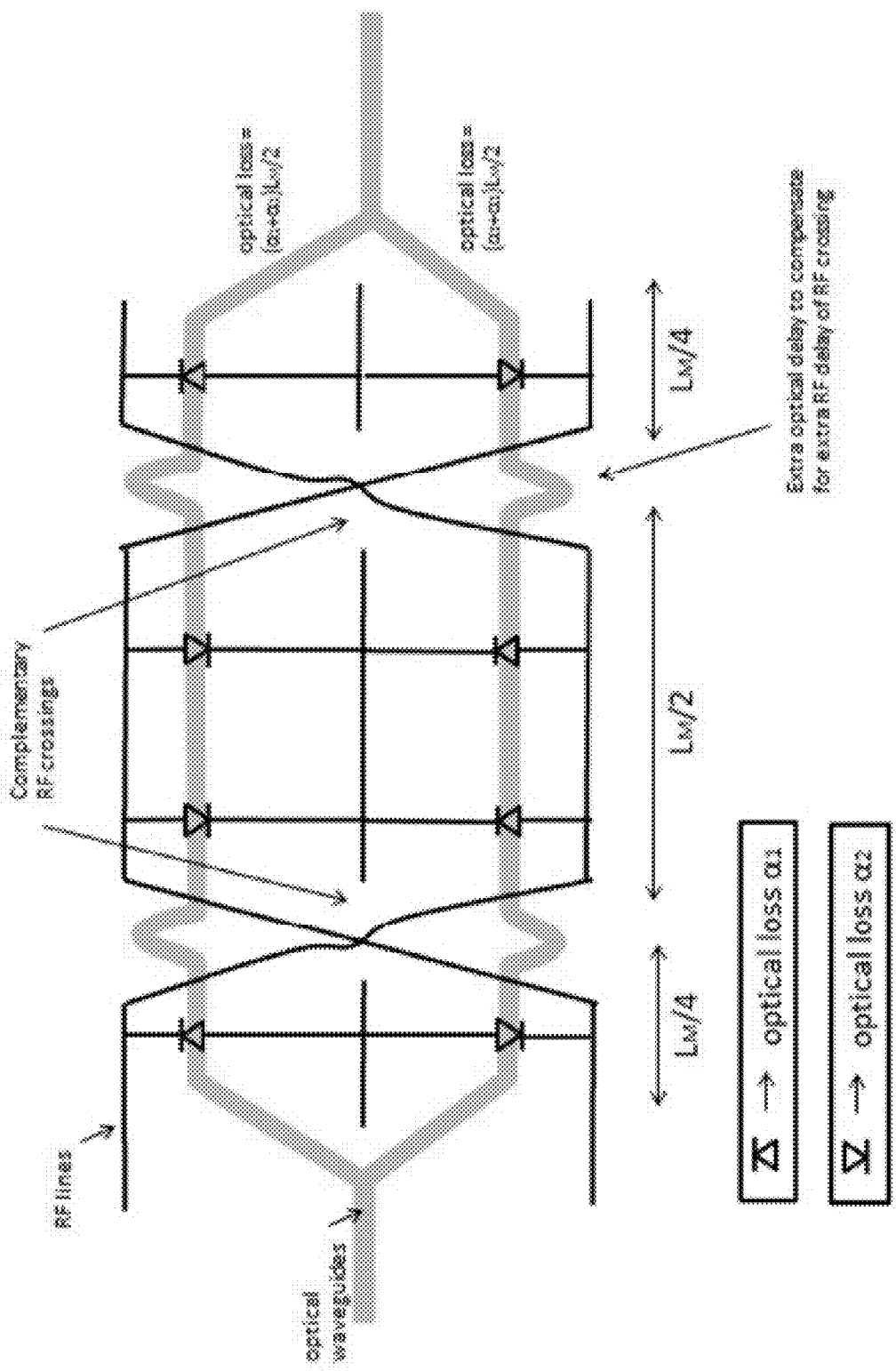
FIG. 8 shows a schematic illustration of a Mach-Zehnder modulator exhibiting RF crossing asymmetry using an even amount of RF crossings wherein at each crossing an extra optical delay is introduced to compensate for the RF delays of the RF crossing according to an aspect of the present disclosure.

Such an arrangement is illustrated schematically in FIG. 8 which shows compensation of RF crossing asymmetry using an even amount of RF crossings. At each crossing, an extra optical delay is introduced to compensate for the RF delays of the RF crossing(s). As may be observed from this figure, two complementary RF transitions equalize the RF attenuation and RF delay in both signal lines. An extra optical delay is introduced at the RF crossings to compensate for the RF delays.

One possible alternative solution where no signal line crossing is needed is to drive the modulator using at least two staggered feeding differential transmission lines which are delayed as necessary. Such an approach may be quite useful for modulators using distributed drivers integrated onto a same chip. However, if the drivers are not integrated this may increase the number of RF connections and terminations by a two-fold amount.

Figure 9:
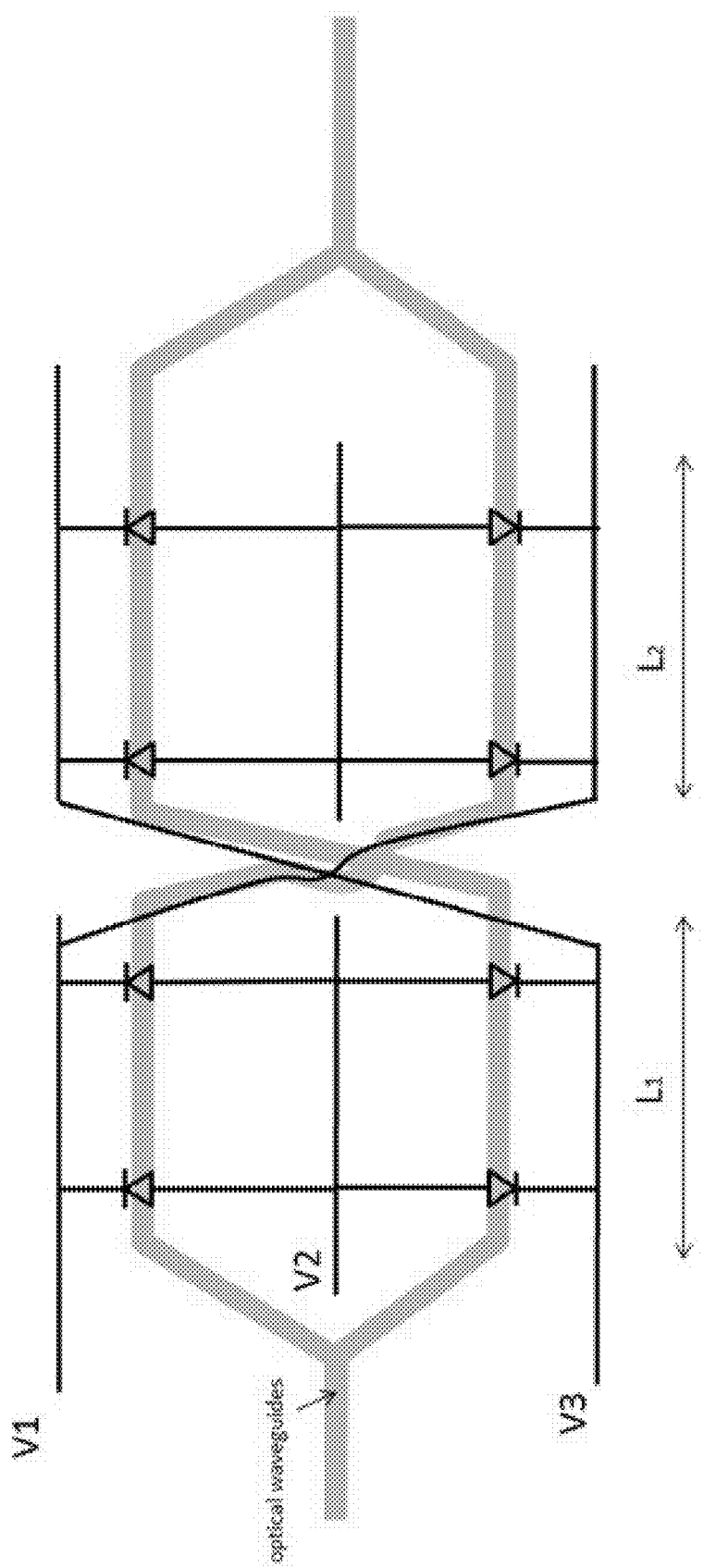
FIG. 9 shows a schematic illustration of generalized robust Mach-Zehnder modulator according to an aspect of the present disclosure.

With reference now to FIG. 9, there is shown a more generalized MZI modulator constructed according to an aspect of the present disclosure. As may be observed, any bias voltage is left floating and the crossings need not be restricted to one according to the present disclosure. A principal of the scheme depicted is tha the MZI is inherently balanced, independent of any mask misalignments.

Those skilled in the art will readily appreciate that while the methods, techniques and structures according to the present disclosure have been described with respect to particular implementations and/or embodiments, those skilled in the art will recognize that the disclosure is not so limited. Accordingly, the scope of the disclosure should only be limited by the claims appended hereto.

The invention claimed is:

1. A Mach-Zehnder optical modulator comprising:
   an input optical waveguide;
   an output optical waveguide;
   a first optical waveguide arm and a second optical waveguide arm each optically connecting the input optical waveguide to the output optical waveguide; a plurality of pn junctions arranged in the first optical waveguide arm and the second optical waveguide arm;
   wherein the first optical waveguide arm includes a first portion of the plurality of pn junctions oriented in a first direction and a second portion of the plurality of pn junctions oriented in a second direction that is different from the first direction, and
   wherein the second optical waveguide arm includes a third portion of the plurality of pn junctions oriented in the first direction and a fourth portion of the plurality of pn junctions oriented in the second direction.

2. The Mach-Zehnder optical modulator according to claim 1, further comprising a number of transmission lines connected to the plurality of pn junctions such that the transmission lines cross one another.

3. The Mach-Zehnder optical modulator according to claim 2, wherein the first optical waveguide arm and second optical waveguide arm cross one another.

4. The Mach-Zehnder type optical modulator according to claim 3, wherein the number of transmission lines cross one another an even number of times.

5. The Mach-Zehnder optical modulator according to claim 1, wherein at least one pn junction of the plurality of pn junctions is a lateral pn junction.

6. The Mach-Zehnder optical modulator according to claim 1, wherein at least one pn junction of the plurality of pn junctions is configured to operate in reverse bias mode.

7. A Mach-Zehnder optical modulator comprising:
   an input optical waveguide;
   an output optical waveguide;
   a first optical waveguide arm connected between the input optical waveguide and the output optical waveguide having a first pn junction having a first orientation and a second pn junction having a second orientation different than the first orientation; and
   a second optical waveguide arm connected between the input optical waveguide and the output optical waveguide.

8. The Mach-Zehnder optical modulator according to claim 7, wherein the first optical waveguide and the second optical waveguide cross one another.

9. The Mach-Zehnder optical modulator according to claim 7, wherein the second optical waveguide has a third pn junction having the first orientation and a fourth pn junction having the second orientation.

10. The Mach-Zehnder optical modulator according to claim 9, wherein the first pn junction is a lateral pn junction.

11. The Mach-Zehnder optical modulator according to claim 9, wherein the first pn junction is configured to operate in reverse bias mode.

12. The Mach-Zehnder optical modulator according to claim 9, further comprising a first transmission line connected to the first pn junction and a second transmission line connected to the second pn junction.

13. The Mach-Zehnder optical modulator according to claim 12, wherein the first transmission line and the second transmission line cross one another.

14. The Mach-Zehnder optical modulator according to claim 13, wherein the first transmission line and/or the second transmission line has a dummy transition configured to compensate for differences in RF losses or RF delay that would otherwise occur between the first and second transmission lines.

15. The Mach-Zehnder optical modulator according to claim 13, wherein the first optical waveguide and the second optical waveguide exhibit optical delays configured to compensate for differences in RF delay existing between the first transmission line and the second transmission line.

16. The Mach-Zehnder optical modulator according to claim 13, wherein the first transmission line and the second transmission line cross one another more than once.

17. The Mach-Zehnder optical modulator according to claim 12, wherein the first transmission line is configured to drive the first pn junction and the third pn junction.

18. The Mach-Zehnder optical modulator according to claim 9, wherein a number of pn junctions of the first orientation in the first optical waveguide arm is equal to a number of pn junctions of the first orientation in the second optical waveguide arm.

19. The Mach-Zehnder optical modulator according to claim 7, wherein the input optical waveguide, the output optical waveguide, the first optical waveguide arm and the second optical waveguide arm comprise silicon.

20. The Mach-Zehnder optical modulator according to claim 7, wherein the Mach-Zehnder optical modulator is formed on a photonic integrated circuit.

21. The Mach-Zehnder optical modulator according to claim 9, further comprising a transmission line connected to the first pn junction and the second pn junction.

* * * * *